Sept. 21, 1937.    F. M. GIFFEN    2,093,671
VALVE
Filed April 13, 1933    2 Sheets-Sheet 2
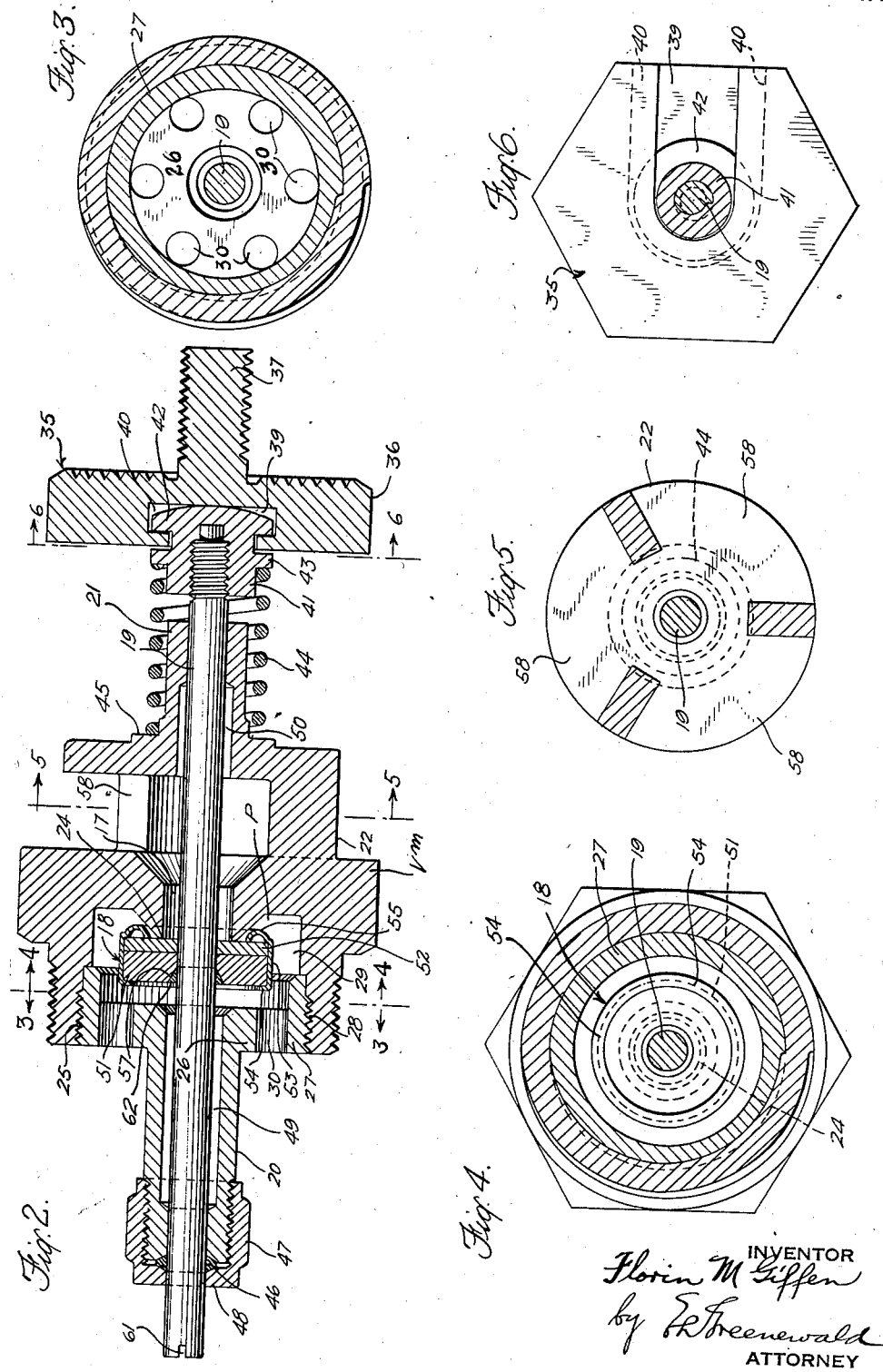
INVENTOR
Florin M. Giffen
by F. R. Greenewald
ATTORNEY Patented Sept. 21, 1937

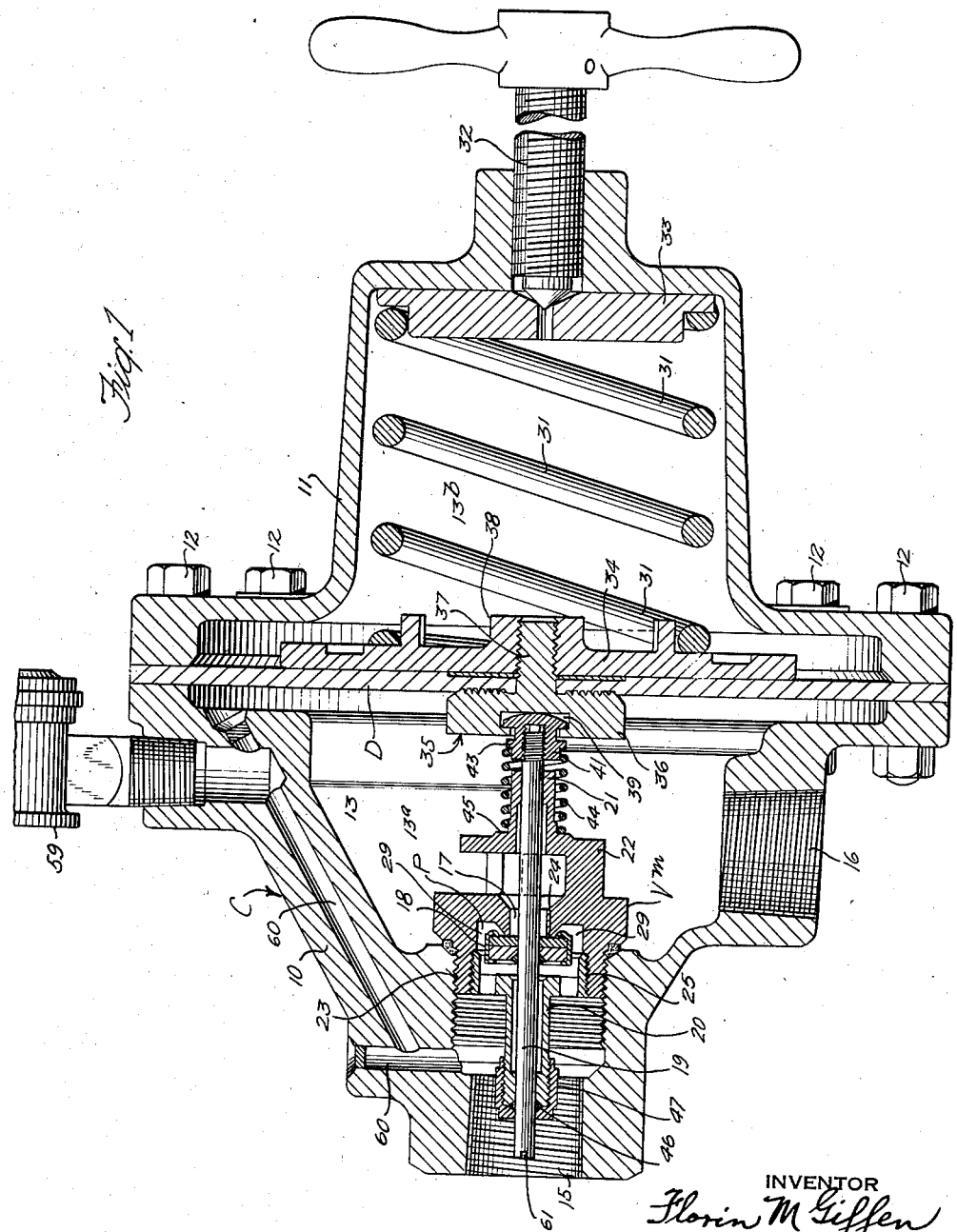

2,093,671

UNITED STATES PATENT OFFICE 2,093,671

VALVE

Florin M. Giffen, Union, N. J., assignor, by mesne assignments, to Union Carbide and Carbon Corporation, a corporation of New York Application April 13, 1933, Serial No. 665,967

5 Claims. (Cl. 50—23)

The present invention relates to valves and valve mechanisms, and more particularly to the support and control of valves constituting parts of fluid control apparatus, such as regulators.

Such regulators are commonly employed in maintaining the discharge of fluid from high pressure chambers at a uniform pressure determined by proper adjustment of well known parts of the apparatus. One type of such regulators comprises a casing having a chamber therein divided by a pressure-responsive diaphragm which is operatively connected with a valve in control of the flow of fluid through the chamber. In such apparatus, the diaphragm is under influence of the pressure in the system controlled by the valve and acts under such pressure to control the opening and closing of the valve, so as to maintain the pressure of the escaping fluid substantially constant. The valve in such apparatus is ordinarily mounted on a stem by means of which it is connected with the diaphragm and through which the diaphragm exercises its control thereof.

An objectionable feature of such apparatus, as heretofore constructed, is that the vibrations of the diaphragm as well as other vibratory influences are impressed on the stem and, through it, upon the valve rendering its operation imperfect and its control of the fluid in the system uncertain. As a result of the vibrations, the valve hammers against its seat causing wear on both of these parts and damage to the stem with an accompanying chattering noise which causes apprehension on the part of an attendant. A further disadvantage in apparatus of this character is that no means has heretofore been provided whereby the valve parts may be protected against shocks due to sudden change or initial impulse of fluid flow. Such apparatus is also usually comprised of an objectionable number of separate parts the assemblage of which with the valve casing is tedious and time consuming.

It is an object of this invention, therefore, to provide an improved valve assembly and mounting whereby complete control over vibratory influences upon the valve will be attained and whereby the valve will be protected against such influences; whereby such influences will be damped out; and whereby the valve parts will be protected against shock due to initial impulse or sudden change in fluid flow.

A further object of the invention is to provide improved valve mechanism which may be assembled as a unit with other mechanism in the valve casing of a fluid flow regulator or other fluid control apparatus.

In accordance with this invention, there may be incorporated in fluid control apparatus such as a fluid flow regulator of the type outlined above, a suitable valve mechanism comprising a housing having a fluid passage therethrough and a valve in said passage cooperating with a seat around a port for controlling the flow of fluid through the passage. The valve is mounted intermediate the ends of a stem which is slidably supported by bearings located on both sides of the valve and the port, one end of the stem being flexibly secured to the diaphragm. Acting on the stem is a suitable braking or damping means, which may be in the nature of a packing pressed against the stem by suitable means such as a gland nut coacting with one of the bearings. By the provision of damping means in conjunction with the arrangement of the supporting bearings, the valve and valve parts are protected against sudden shocks and vibrational influences which are thereby effectively brought under control. The valve mechanism is preferably so constructed that it may be assembled as a unit which as a whole may be suitably connected in the casing, as will hereinafter appear.

The above and other objects and novel features of the invention will be made apparent from the following specification taken with the accompanying drawings, in which:

Fig. 1 is a sectional view taken axially through a valve casing showing an arrangement of mechanism in accordance with the present invention.

Fig. 2 is an enlarged sectional detail view of the valve mechanism taken axially thereof and showing the arrangement and connection of the various parts, also showing the same as assembled with the diaphragm screw.

Fig. 3 is a view in cross section on line 3—3, Fig. 2.

Fig. 4 is a view in cross section on line 4—4, Fig. 2.

Fig. 5 is a view in cross section on line 5—5, Fig. 2.

Fig. 6 is a view in cross section on line 6—6, Fig. 2.

The detailed construction of the valve mechanism in accordance with the present invention and as illustrated in the figures described above, comprises a casing C formed by a body 10 and a cap 11 suitably connected as by bolts 12 to provide a chamber 13 which is preferably divided into compartments 13a and 13b by a pressure-responsive means, as a diaphragm D. The walls of the body portion are provided with inlet and outlet ports 15 and 16, in the former of which is mounted valve mechanism V^m. The valve mechanism includes a valve holder or housing 22 having a bore or passage P therethrough including a further port 17 therein located intermediate of the ports 15 and 16. The port 17 is controlled by suitable valve means, such as a valve 18 mounted on a valve stem 19 which is suitably supported for sliding movement axially of and preferably through the port 17.

The support for the valve stem is in the nature of guide sleeves or bearings 20 and 21 positioned on opposite sides of the port 17 and valve 18; and these guides 20 and 21 are supported in chamber 13a by a holder 22 which is, preferably, detachably connected to the casing body 10 by interengaging threads at 23.

The bore P of the valve holder 22 extends axially thereof and also axially of the chamber 13a and is constricted at one end to provide a valve seat 24 surrounding the port 17. This bore is internally threaded at its other end as at 25; the threads serving to detachably connect the guide member 20 to the valve holder. To this end the guide member 20 is provided with a flange 26 extending radially from one end thereof and having formed at its peripheral margin an axially extending tubular sleeve 27 externally threaded at 28; the threads 28 engaging the threads at 25. The flange 26 and the constricted opposite end of the bore, together with the walls of the bore, definite a valve chamber 29 and limit the axial movement of the valve 18 positioned therein. The flange 26 is provided with apertures 30 to permit passage of fluid into the valve chamber; passage thereof through port 17 into chamber 13a being of course controlled by the valve 18.

In the valve mechanism V^m described above, the parts thereof may be assembled before mounting in the casing C, and the assembly may be mounted in the casing as a unit. This mechanism is particularly adapted for use in pressure-responsive fluid flow regulators, and in the present embodiment the valve 18 is controlled by the diaphragm D to which the stem 19 is operatively connected.

The pressure at which the diaphragm will operate the valve may be adjustably regulated through a spring 31 by a pressure adjusting screw 32 threaded into the cap 11 and acting against the button or spring washer 33 resting on one end of spring 31; the other end of the spring being seated against the diaphragm plate 34 which contacts with the diaphragm D. The diaphragm plate has an extended contact with the diaphragm and is centrally connected therewith by a screw 35 having a head 36 resting on the opposite side of the diaphragm and a shank 37 extending through the diaphragm and threaded into a boss 38 on the plate 34.

The head 36 of the screw is provided with a recess or groove 39 constructed with undercut sides 40 forming ledges to permit the assembly of the head with a nut 41 which is threaded to the end of the valve stem 19; nut 41 having a flanged head 42 overlapping and interengaging with the ledges on opposite sides of the recess or groove 39. The recess 39 extends from the center to the edge of the screw head to permit ready assembly or disengagement of the nut and screw and is so shaped as to permit a relative rocking movement between the stem nut and the said head. This is desirable since the diaphragm movement is not always exactly axial, but may also have a somewhat eccentric movement about an axis other than that of the stem. To this end the head 42 of the nut 41 is rounded so as to have a more or less ball and socket connection with the screw head 36. The nut 41 is formed with a spring seat in the nature of an annular shoulder 43 against which one end of a valve closing spring 44 abuts; the other end of this spring abutting against a seat 45 on the valve holder 22. The guide portions of the sleeves or bearings 20 and 21 are placed as near the ends of the stem as is feasible in order to prevent lateral vibrations thereof but a sufficient gap must be maintained between the sleeve 21 and the nut 41 to afford sufficient play of the valve stem to close the valve 18; the distance being approximately equal to the play of the valve in the valve chamber 29.

An important feature of the invention is the provision of a packing 46 surrounding the valve stem 19 and compressed thereagainst by cooperation of a gland nut 47 with the end of the guide sleeve 20 to which the nut is threaded so as to permit adjustment of the pressure exerted on the packing and, in consequence, the amount of drag exerted by the packing on the valve stem. It will be noted that the end of the sleeve 20 is chamfered inwardly toward its bore and that the flange 48 at one end of the nut is sloped in a reverse direction along the axis of the bore, thereby cooperating to provide an annular recess for accommodation of the packing when the nut and sleeve are assembled. By this arrangement, axial vibrations of the rod and valve are brought under positive control, or may be effectively damped out and prevented from influencing the effectiveness of the valve; and sudden shock to the valve parts, due to sudden initial impulse or change of gas flow, is prevented. The valve stem is slidably mounted in the manner stated above and frictional retardation of its movements other than by the adjustable packing is minimized by provision of counterbores 49 and 50 respectively in the guide members or sleeves 20 and 21. The counterbore 49 will permit substantially the same pressure of fluid to be exerted on either side of the packing 46.

A novel mounting of the valve on the valve stem of important advantage in the present construction is provided and consists of an annular collar 51 of brass or the like secured to the valve stem about midway between the ends thereof by suitable means, as by solder. Against this collar is placed a washer 52 of rubber or the like, preferably a suitable grade of comparatively soft mouldable rubber, and held in place by a suitable retainer 53, the ends 54 and 55 of which are turned in to provide flanges resting respectively against the faces of the collar and washer. The collar 51 may be chamfered as at 57 on its inner periphery to provide a recess for reception of the solder 62 serving to bind it to the stem. The flange 55 is preferably preformed and turned inwardly to present its edge axially against the washer as shown, while the flange 54 is preferably formed after assembly with the washer and collar. The washer is positioned to seat against the valve seat 24 which is in the nature of a raised ledge annularly surrounding the port 17. On the outlet side of the port 17, the valve holder 22 is provided with radial openings 58, to permit free passage of fluid into chamber 13.

Suitable gauges 59 may be connected with the fluid passage as by ducts 60 and the valve stem 19 may be provided at its free end with a slot 61 for reception of a screw driver in disconnecting the stem from the nut 41 when it is desired to disconnect the valve mechanism from the casing.

The valve assemblage hereinbefore described has the advantages of eliminating vibratory influences from the valve whether caused by the diaphragm 14 or other extraneous influences. It permits of adjustment in operation between the valve stem and diaphragm compensatory of other than axial movements of the latter with respect to the former; provides a steady unvarying movement of the valve stem; and supports the same firmly against vibration and against shock such as caused by a sudden change in flow of the fluid passing therethrough.

In use, the inlet port 15 of the casing C may be connected with a fluid container; suitable distribution apparatus may be connected to the outlet port 16; and, after proper adjustment of the diaphragm D through the spring 31 and screw 32 for response to the desired pressure, the valve of the container may be opened whereupon the apparatus herein described will act automatically to maintain the said pressure. Should the stem and valve vibrate in sympathy with the diaphragm, or for any other reason, the compression of the packing 46 may be adjusted by means of the gland nut 47 so as to control or eliminate the same.

The construction of the valve mechanism lends itself to a pre-assemblage of the elements thereof after which it may be, as a whole, conveniently connected in the casing. In assembling the valve mechanism V$^m$, the stem 19 with the valve 18 secured thereto is extended through the bore of the housing 22 until the threaded end of the stem 19 projects beyond the bearing sleeve 21 and the valve rests in the valve chamber 29, whereupon the nut 41 may be connected to said end. The bearing sleeve 20 may then be slipped onto the stem and the sleeve 27 screwed into the housing 22. The packing 46 may then be placed against the end of the sleeve 20 and clamped in place by the nut 48, after which the valve mechanism so assembled may be connected as a unit with the valve casing. The screw 35 and the diaphragm plate 34 with the diaphragm D clamped therebetween may then be assembled with the valve mechanism by sliding the head into the socket 39 whereupon the body 10 and cap 11 may be connected by the bolts 12 so as to grip the edges of the diaphragm 14 therebetween; the spring 31 and other diaphragm adjusting accessories having been assembled with the cap prior to connection of the body and cap.

I claim:

1. In valve mechanism, the combination of a casing having a one-way main passage therethrough; a valve controlling the flow of fluid through said passage and having a stem secured thereto, said stem extending axially in said main passage; and removable tubular bearing means for slidably supporting said stem, the major portion of the length of said stem being at all times within the bearing means and also clearing said passage substantially throughout such length, said passage having a port opening therein intermediate of the bearing means and radially with respect to said passage.

2. In valve mechanism, the combination of a casing having a passage therethrough; a valve holder having a passage therethrough connected with and forming a part of the passage in the casing; a valve stem slidably mounted in the holder and a valve thereon for controlling the flow of fluid through the passage therethrough; means including a gland nut and packing on said holder for preventing vibrations of the valve and stem; said valve holder with the parts carried thereby being detachably connectible as a unit to the casing within the passage.

3. In valve mechanism, the combination of a casing having a passage therethrough; valve means for controlling flow of fluid through said passage including a stem slidably mounted in said passage; a valve supported thereby and including a collar fixed to the stem; a washer resting against the collar and means including a retainer having an inwardly turned edge overlapping the edge of the washer for securing said washer to the collar.

4. In valve mechanism, the combination of a casing having a passage therethrough; a valve holder supported in said passage and having a passage therethrough connecting with the passage in the casing; valve means slidably mounted in the passage through the holder for controlling the flow of fluid therethrough including a stem and a valve secured thereto intermediately of its ends; said holder having bearings for the stem on opposite sides of the valve one of which is removable from the holder to permit removal of the valve means; and compressibly adjustable vibration preventing means supported by the valve holder so as to press against the valve stem.

5. In valve mechanism, the combination of a casing having a passage therethrough; a valve holder supported in said passage and having a passage therethrough connecting with the passage in the casing; valve means slidably mounted in the passage through the holder for controlling the flow of fluid therethrough, said valve means including a stem and a valve secured thereto intermediately of its ends, said holder having bearings for the stem on opposite sides of the valve, one of which is removable from the holder to permit removal of the valve means; and adjustable vibration damping means carried by the holder for preventing vibration of said valve means.

FLORIN M. GIFFEN.